United States Patent [19]

Moyer

[11] Patent Number: 4,680,842
[45] Date of Patent: Jul. 21, 1987

[54] MULTIPLE PART SIMULTANEOUS FORMING APPARATUS

[75] Inventor: William D. Moyer, Palatine, Ill.

[73] Assignee: Automation Associates, Inc., Arlington Heights, Ill.

[21] Appl. No.: 765,844

[22] Filed: Aug. 15, 1985

[51] Int. Cl.$^4$ ............................................. B23Q 3/00
[52] U.S. Cl. ..................................... 29/33 P; 29/563; 29/564; 33/557
[58] Field of Search ............ 29/564, 563, 37 R, 34 C, 29/38 R, 33 P, 33 J, 33 K; 409/133, 134; 408/37, 7, 6, 2; 250/231 R, 229; 33/557, 552, 558, 560, 561

[56] References Cited

U.S. PATENT DOCUMENTS

| | | | |
|---|---|---|---|
| 1,902,762 | 3/1933 | Conlon | 408/7 |
| 2,008,150 | 7/1935 | Nelson | 250/229 |
| 3,030,827 | 4/1962 | Merwin | 408/7 |
| 3,666,951 | 5/1972 | Gertung | 250/229 |
| 4,056,329 | 11/1977 | Perry | 408/6 |
| 4,080,089 | 3/1978 | Matsushimo | 408/2 |
| 4,263,810 | 4/1981 | Chiu | 250/231 R |
| 4,379,968 | 4/1983 | Elyehl | 250/229 |
| 4,441,245 | 4/1984 | Thornton et al. | 29/564 |

Primary Examiner—William R. Briggs
Attorney, Agent, or Firm—Wood, Dalton, Phillips, Mason & Rowe

[57] ABSTRACT

An apparatus for simultaneously working a plurality of workpieces comprising a support wheel defining a rotary axis and a periphery, means for rotatably indexing said support wheel in preselected angular steps about said axis, receiving means on said support wheel periphery for receiving one each said workpieces in similar orientation; retaining means for fixedly retaining said workpieces in said receiving means, first working means for simultaneously similarly working a preselected plurality of the workpieces retained in said receiving means, said plurality corresponding in number to one of said angular steps, to define a plurality of partially worked workpieces, sensing means for simultaneously sensing the condition of each of the worked workpieces and preventing further indexing of said suport wheel in the event an undesirable condition of any of the workpieces is sensed, second working means for further working said workpieces subsequent to sensing of the condition thereof by said sensing means, and means for delivery seriatim the further worked workpieces from said receiving means.

16 Claims, 15 Drawing Figures

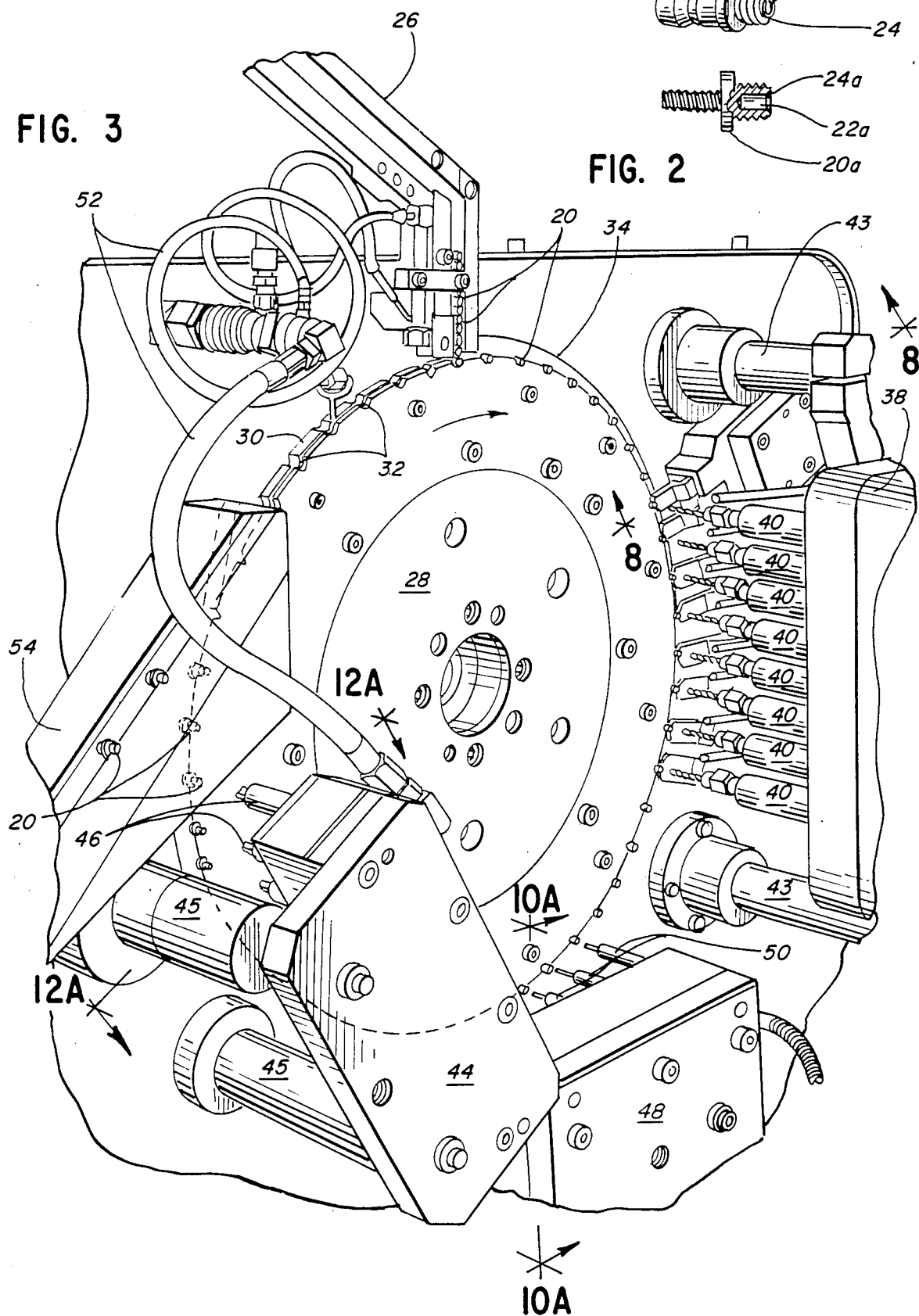

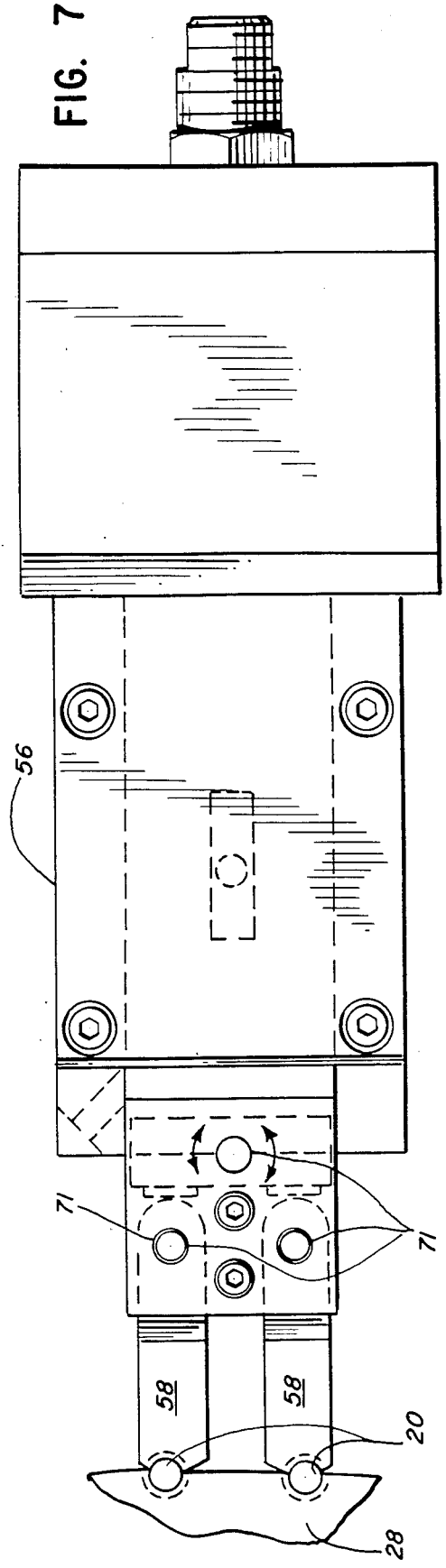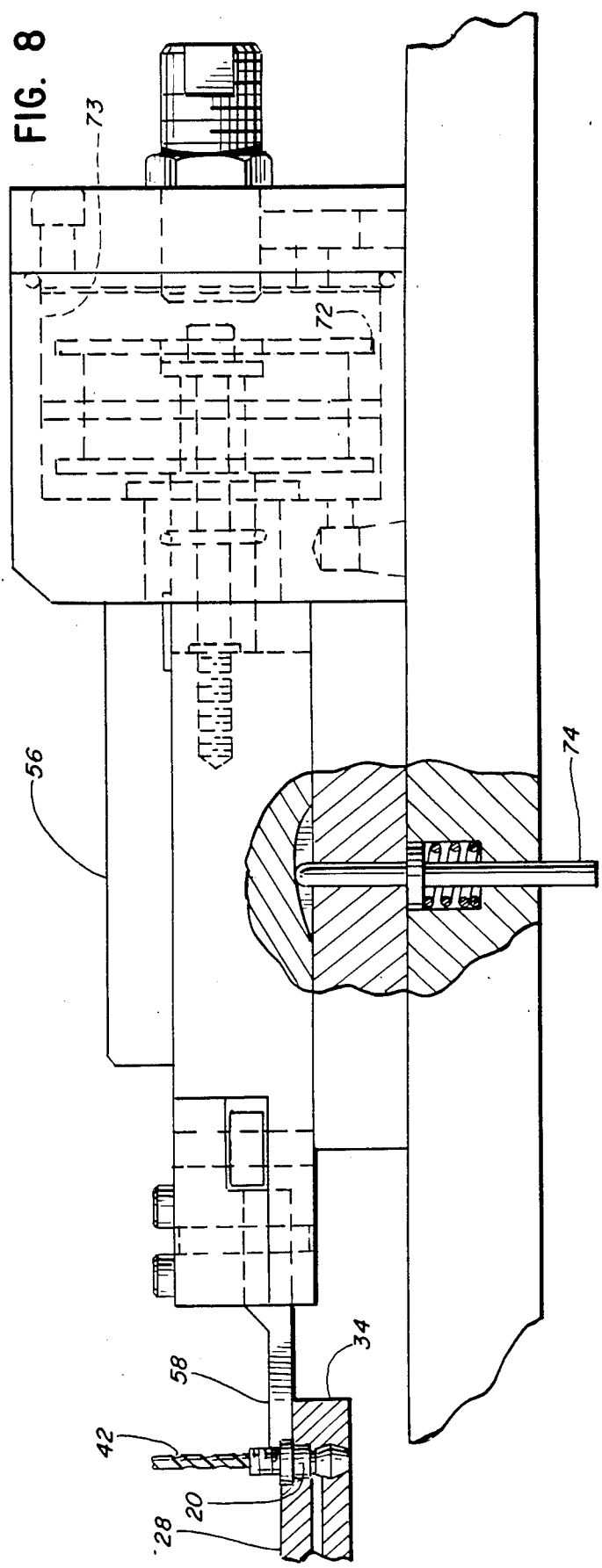

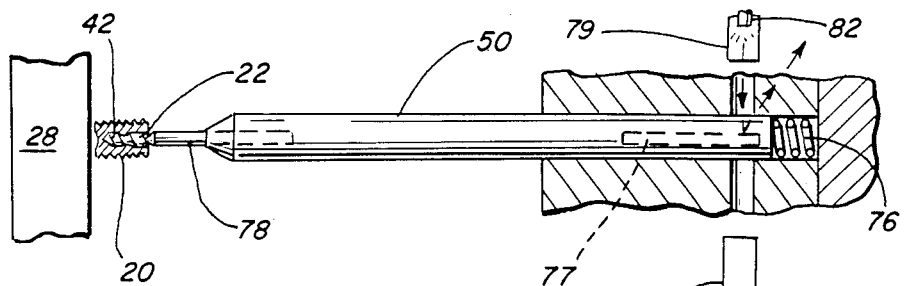
FIG. 11
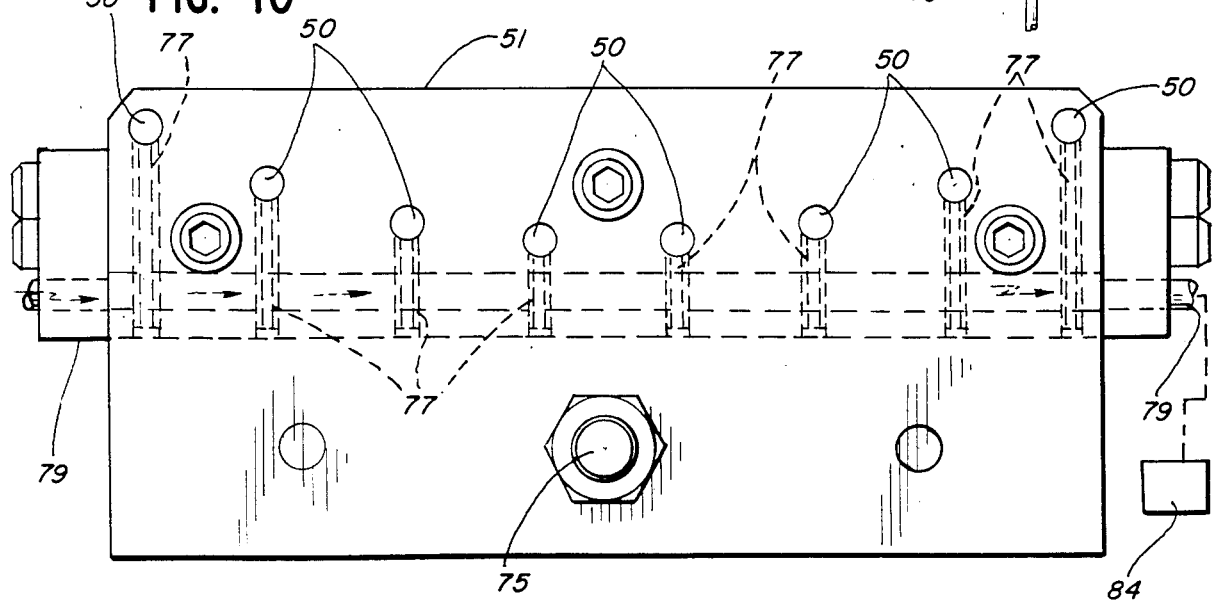
FIG. 10
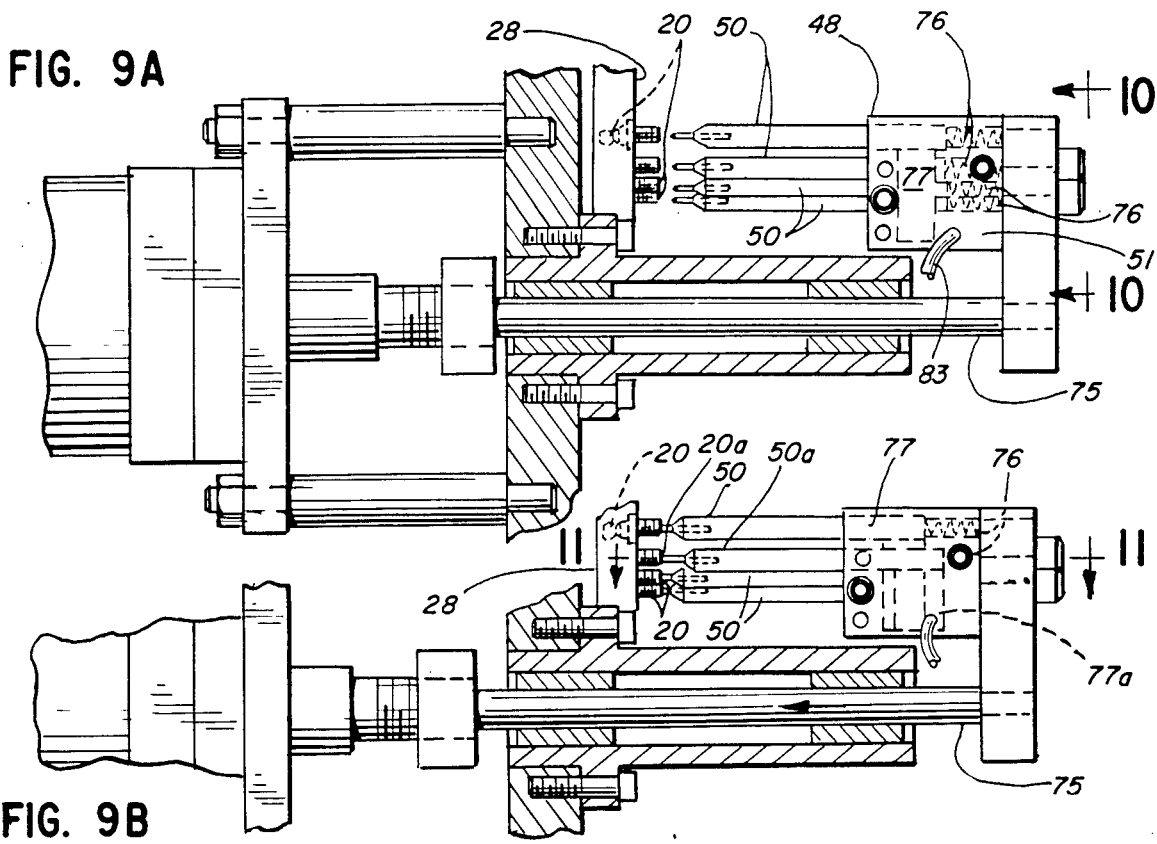
FIG. 9A
FIG. 9B

MULTIPLE PART SIMULTANEOUS FORMING APPARATUS

DESCRIPTION

1. Technical Field

The present invention relates generally to machine tools and more particularly to an apparatus for simultaneously machining a plurality of workpieces in a plurality of steps seriatim.

2. Background Art

Machine tools have long been used to perform various machining operations upon a workpiece. For automatically supporting the workpiece during the machining operations, the workpiece often is received and retained axially on the circumference of a rotatable support wheel. After receiving the workpieces, the support wheel is indexed to cause the workpiece to become registered with a first tool, at which time the first tool, for example a drill, performs a first machining operation on the workpiece.

Commonly a plurality of different machining operations are performed on the same workpiece in the same apparatus. Upon completion of the first machining operation, the support wheel is again indexed, to reposition the workpiece in registry with a second tool. The second tool, for example a staker, then performs a second machining operation upon the workpiece.

While such a procedure performs a plurality of desired successive machining operations, productivity of the machine is limited because the workpieces are machined one at a time. Further, often a successful second machining operation is dependent upon a successful completion of the first machining operation. For example the first machining operation may drill a longitudinal hole in the workpiece and the second machining operation may upset the drilled opening. Failure of the first machining operation, for example a broken drill bit failing to drill the hole, can subsequently cause damage to the second tool when the second tool attempts to upset the metal about a hole that does not exist.

SUMMARY OF THE INVENTION

In accordance with the present invention, a machine embodying the invention includes a first plurality of tools for performing a first working, e.g., machining operation simultaneously upon a plurality of workpieces spaced on the periphery of a support wheel, and a second plurality of tools for performing a second working operation simultaneously upon the group following completion of the first working operation thereon and subsequent indexing of the support wheel.

Further, prior to the second working operation and subsequent to the first working operation, a novel probe apparatus determines by means of a single sensor whether all of the first tools have successfully completed the first working operation upon the group. If it is determined that the first tools did not successfully complete all of the first working operations, the machine is automatically shut down whereby damage to the second tools is avoided.

Thus production is increased as groups of workpieces are simultaneously machined, waste is reduced as workpieces improperly machined by the first tools are immediately detected and damage to the second tools is avoided as only workpieces properly prepared by the first tools are positioned for machining by the second tools.

More specifically the invention comprehends the provision of an apparatus for simultaneously metal working a plurality of workpieces including a support wheel defining a rotary axis and a periphery, means for rotatably indexing the support wheel in preselected angular steps about the axis, receiving means on the support wheel periphery for receiving one each the workpieces in similar orientation, retaining means for fixedly retaining the workpieces in the receiving means, first working means for simultaneously similarly working a preselected plurality of the workpieces retained in the receiving means, the plurality corresponding in number to one of the angular steps, to define a plurality of partially worked workpieces, sensing means for sensing an undesirable condition for any of the worked workpieces and preventing further indexing of the support wheel in the event such undesirable condition is sensed, second working means for further working the workpieces subsequent to sensing of the condition thereof by the sensing means and means for delivering seriatim the further worked workpieces from the receiving means.

In the illustrated embodiment the retaining means is attached to hold the workpieces against rotation parallel to the rotary axis of the wheel.

BRIEF DESCRIPTION OF THE DRAWING

Other features and advantages of the invention will be apparent from the following description taken in connection with the accompanying drawing wherein:

FIG. 1 is a perspective view of a workpiece formed by means of the present invention;

FIG. 2 is a side elevation partially in diametric section of an alternative workpiece;

FIG. 3 is a fragmentary perspective view of an apparatus embodying the present invention;

FIG. 7 is an illustration of a clamping station of said apparatus;

FIG. 8 is a sectional elevation of the clamping station of said apparatus;

FIGS. 9A,B illustrate a probe assembly;

FIG. 10 is an end view of the sensor assembly taken substantially along the line 10—10 of FIG. 9A;

FIG. 11 is a section taken substantially along the line 11—11 of FIG. 9B;

BEST MODE FOR CARRYING OUT THE INVENTION

Figure 4:
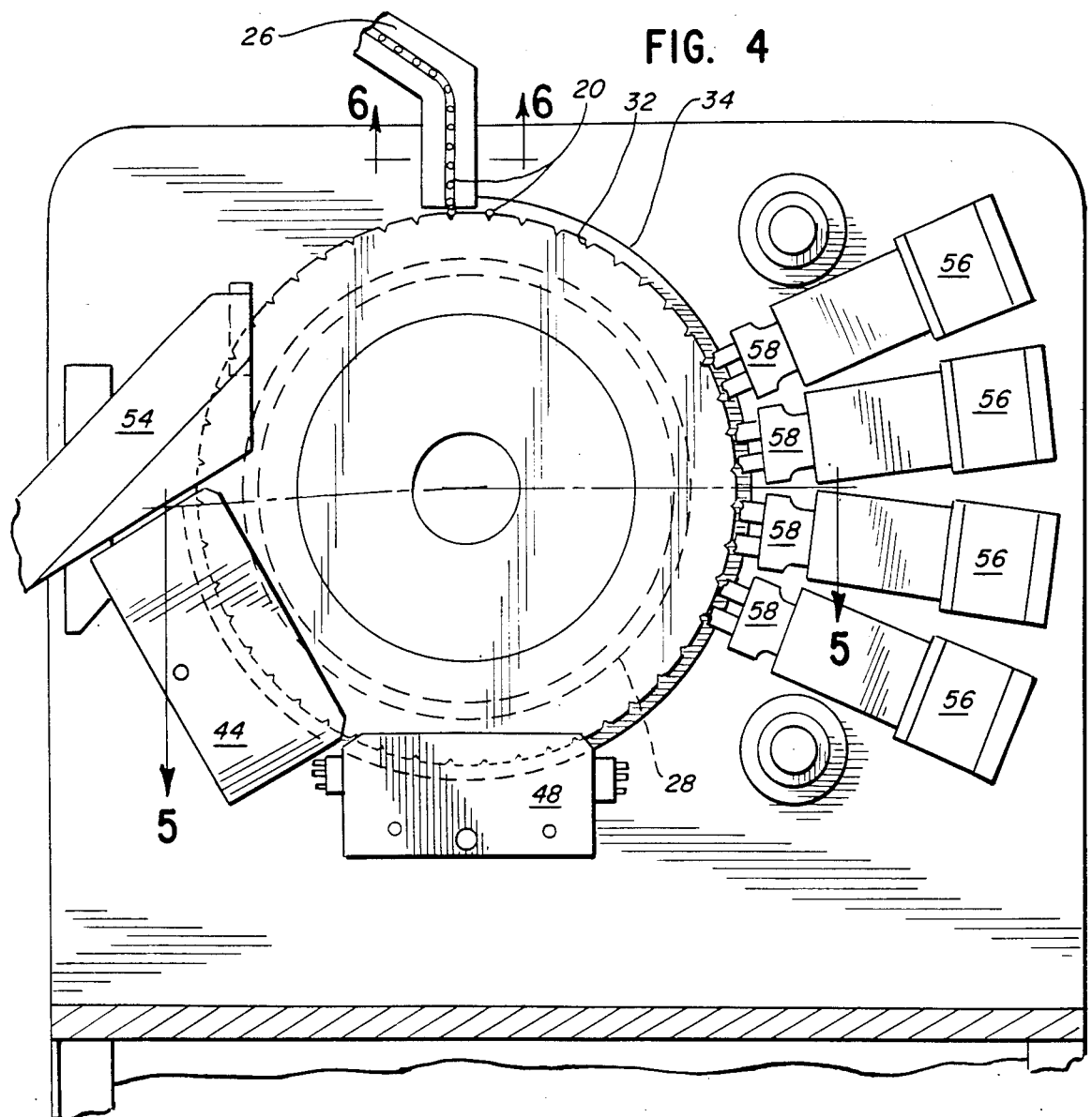
FIG. 4 is a fragmentary elevation of the apparatus.

FIGS. 1 and 2, illustrate two different configurations of workpieces 20 and 20a as may be formed by the present invention. In each, a drilled hole 22, 22a and an upset edge 24, 24a are provided in accordance with the present invention, as discussed in greater detail below.

Referring to FIG. 3, apparatus 18 embodying the present invention includes a supply chute 26, for providing a supply of unworked workpieces seriatim to a clockwise-rotatable supply wheel 28. Supply wheel 28 includes a circumferential portion 30 defining a plurality of radially outwardly opening grooves 32. Each of grooves 32 is arranged to receive one of the workpieces 20 supplied by the supply chute 26 as the particular groove 32 becomes aligned with the supply chute 26. As further discussed below, the shape of the grooves 32 is complementary to the exterior configuration of the workpieces 20.

A retainer rail 34 is extended about the circumferential portion 30 approximately 270° from the chute 26 in a clockwise direction. Rail 34 retains each workpiece 20 in the respective groove 32 as the supply wheel 28 rotates.

A drill tool 38 for performing drilling operations simultaneously on eight workpieces 20 includes eight drill bits 40. The drill bits are movable axially with respect to the drill tool 38. A pair of support guides 43 provides support for the drill tool 38.

A staking means 44 includes eight staking tools 46 which perform a staking operation simultaneously upon eight of the previously drilled workpieces 20. The staking apparatus 44 is movable axially with respect to the supply wheel 28 by means of a pair of first piston rods 45 connected to a pair of first piston and cylinder devices, not shown.

A probe assembly 48, including eight probes 50 and a sensor assembly 51, simultaneously inspects eight workpieces 20 to determine proper drilling thereof by drilling apparatus 38. Apparatus 18 may be pneumatically operated by pressurized fluid delivered through pneumatic tubes 52.

Operation of apparatus 18 generally is as follows. Supply wheel 28 is rotatably indexed in a clockwise manner, enabling the supply chute 26 to sequentially load eight of the unworked workpieces 20 into eight successive ones of the grooves 32 as the particular grooves 32 pass under chute 26. The supply wheel 28 continues to index until the eight loaded workpieces 20 are aligned with the eight drill bits 40 of drill tool 38. Rotation of the supply wheel 28 is temporarily stopped while drill bits 40 are caused to drill holes 22 in the ends of the workpieces 20.

Supply wheel 28 then rotatively indexes to bring a new set of eight unworked workpieces 20 into register with the drill bits 40. Concurrently, the partially worked workpieces 20, i.e., those previously drilled by the drill tool 38 are brought into register with the eight probes 50 of probe assembly 48. Probes 50 determine whether the drilled holes 22 were properly drilled in the workpieces 20 by the drill bits 40. If one of the probes 50 determines that the respective drilled hole 22 is defective, the entire apparatus 18 is shut down.

If the probe assembly 48 determines that each of the drilled holes 22 was properly drilled, the supply wheel 28 is again indexed, moving the eight probed workpieces 20 into register with the eight staking tools 46 of staking means 44 which then is actuated to effect a staking of the end of the drilled workpieces 20.

Upon completion of the staking operation, the supply wheel 28 is again rotatably indexed. The retainer rail 34 terminates just beyond the staking means 44 and at this point each of the completed workpieces 20 falls from the supply wheel 28 to be suitably transferred by a transfer chute 54.

It is to be understood that the apparatus 18 performs a continuous operation and that simultaneously with each of the eight workpieces 20 being worked by the staking means 44, eight different workpieces 20 are being probed by the probe assembly 48, eight further different workpieces 20 are being drilled by the drill tool 38, and eight still further different workpieces 20 are being loaded onto the supply wheel 28.

Referring now to FIG. 4, four clamping stations 56, each including a pair of radially extending jaws 58, secure each of the workpieces 20 as of the workpieces 20 are being drilled by the eight drill bits 40, thereby preventing rotation of the workpieces 20.

As discussed above, the retainer rail 34 extends circumferentially in a clockwise direction around the supply wheel 28 from the supply chute 26 to just beyond the staking means 44. Thus, when each of the workpieces 20 is carried beyond staking means 44, and hence beyond the retainer rail 34, gravity causes the workpieces to fall away from the supply wheel 28 and into the transfer chute 54.

Figure 5:
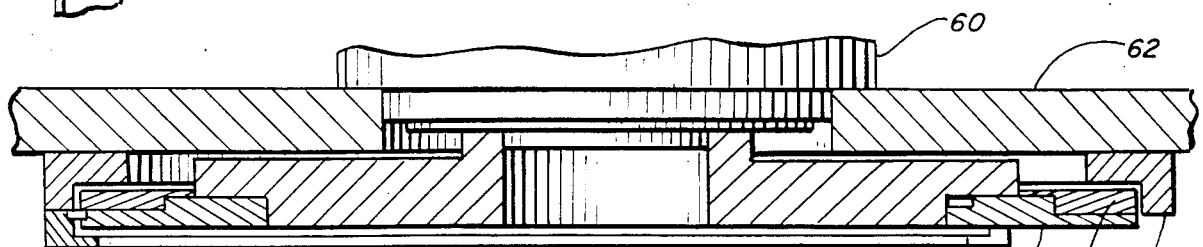
FIG. 5 is a section taken substantially along the line 5—5 of FIG. 4 illustrating in greater detail the support wheel of said apparatus.

As shown in FIG. 5, supply wheel 28 includes an indexer 60, a face plate 62, a dial plate 64, a nest disk 66, and an insert disk 68.

Each workpiece 20 is radially retained on the supply wheel 28 by an interference fit created by the nest disk 66 and the insert disk 68 on one side and the retainer rail 34 on the other side and axially retained by the face plate 62 and the retainer rail 34. By changing the circumferential shape of the nest disk 66 and the insert disk 68, the supply wheel 28 can be modified to retain workpieces 20 having various shapes and sizes.

The indexer 60 may be driven by conventional motive and control means, not shown, which are well known in the art.

Figure 6:
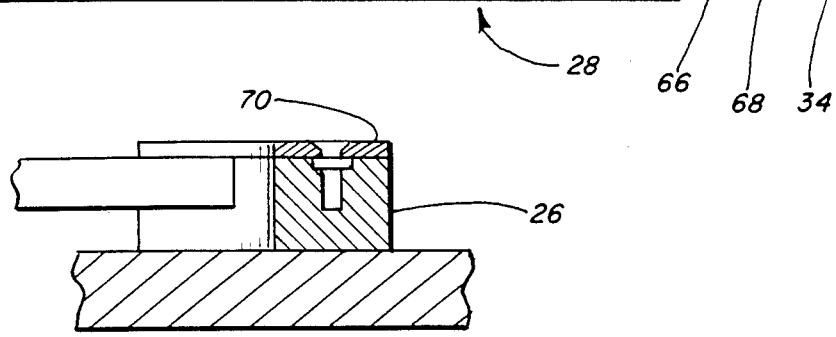
FIG. 6 is a section taken substantially along the line 6—6 of FIG. 4 illustrating a workpiece chute of said apparatus.

Referring to FIG. 6, the supply chute 26 includes a cover rail 70 for preventing the workpieces 20 from falling out of the supply chute 26 prior to transfer onto the supply wheel 28.

The clamping station 56 is illustrated in FIG. 7. As shown, the jaws 58 extend longitudinally toward the supply wheel 28 when two of the workpieces 20 are in line therewith. The clamping station 56 includes pivots 71 to allow for proper alignment of the jaws 58 with the workpieces 20.

Referring now to FIG. 8, the clamping station 56 includes a piston 72 located within a cylinder 73, and connected to the jaws 58 to cause the longitudinal movement thereof. When a jaw 58 abuts against the workpiece 20, the workpiece 20 is securely held by means of the frictional grip between the jaw and the supply wheel 28. Thus rotation of the drill bit 40 is prevented from causing concurrent rotation of the workpiece 20.

An actuating pin 74 coupled to appropriate control means controls the extension of the jaw 58.

Referring now to FIGS. 9A and 9B, the probe assembly 48 is movable axially with respect to the storage wheel 28 by means of a second piston rod 75 coupled to a second piston and cylinder device, not shown.

In FIG. 9A, probe assembly 48 is illustrated in a hold position, which is the position of the probe assembly 48 as the supply wheel 28 is being indexed.

Each of the probes 50 is slidably mounted in the sensor assembly 51 and is biased to the left in an extended position by a compression spring 76. Further, each of the probes 50 include a vertically-downward directed flag 77.

As discussed in greater detail below, a beam of light is transmitted through the sensor assembly 51. When all of the probes 50 are positioned fully to the left, none of the flags 77 interrupts the beam of light.

Referring now to FIG. 9B, the probe assembly 48 is illustrated in a probing position. When the eight machined workpieces 20 are brought into register with the eight probes 50, the probe assembly 48 is brought to the probing position.

The probes 50 determine whether a drilled hole 22 was properly drilled in the respective workpiece 20. If a drilled hole 22 was properly drilled, the respective probe 50 will enter the drilled hole 22 as the probe assembly 48 moves to the probing position and the probe 50 will remain biased to the left with respect to the sensor assembly 51. However if a hole 22 was not properly drilled in the workpiece, as indicated as 20a, or a broken drill bit remains in the hole, a respective probe 50a will be forced to the right against the biasing action of spring 76 to a retracted position. In the retracted position, the flag 77a on the probe 50 will block the beam of light.

Referring now to FIG. 10, the sensor assembly 51 is illustrated. Fiber optic cables 79 conduct the light to and from the sensor assembly 51.

Flags 77 are of different lengths corresponding to the arcuate orientation of the probes 50, which as shown causes the probes 50 to be at varying distances from the path of the light beam.

In FIG. 11, probe 50 is illustrated as being moved to the retracted position. The probe 50 includes a distal end tip 80 which has been prevented from entering the drilled hole 22 by a broken drill portion 81, thereby causing the flag 77 to block the sensing light beam.

As discussed above, when the probe assembly 48 moves to the probing position, each probe tip 80 concurrently moves toward its respective workpiece 20. If the workpiece 20 has been drilled properly by the respective drill bit 40 during the drilling operation, the probe tip 80 can move into the drilled hole 22 of the workpiece 20.

If the respective workpiece 20 has not been drilled properly, or if the broken drill portion 81 of the drill bit 40 becomes lodged within the drilled hole 22, the probe tip 80 will be prevented from moving into the tapped hole 22. Thus the probe 50 will be forced back to the retracted position as discussed above.

A light source 82 limits the beam of light delivered thereto by fiber optic cable 79. So long as the beam of light is not blocked by any of the flags 77, the beam will be received and transferred to a light receiver 84. A signal generated by the light receiver 84 indicates whether the light beam has been blocked by any of the flags having been forced to the interrupting position. Conventional control circuitry, not shown, made to be responsive to the generated signal, shuts down the entire apparatus 18 in the event the beam of light is broken.

Figure 12A:
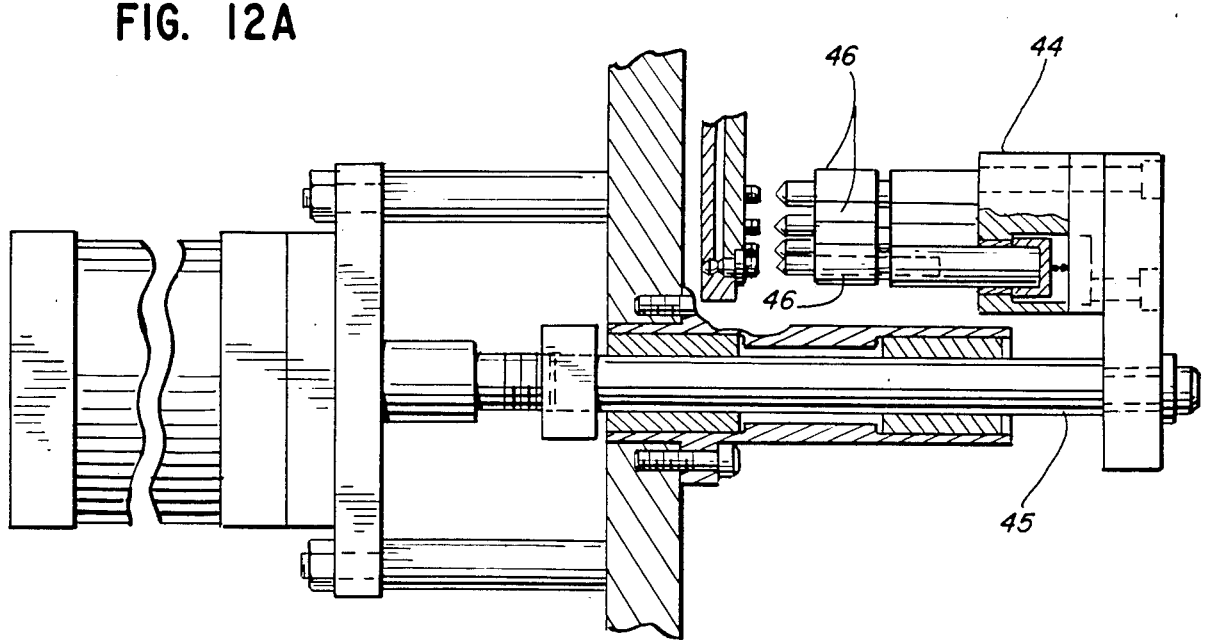
FIGS. 12A and 12B illustrate successive steps in the staking operation.

In FIGS. 12A and B, the operation of the staking means 44 performing the illustrative second working operation, i.e., a staking operation is illustrated.

Figure 13:
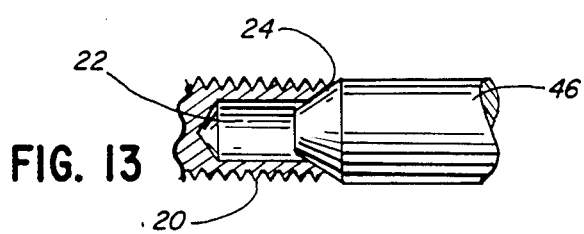
FIG. 13 illustrates in greater detail the staking operation.

The staking operation upsets the outer edge 24 of the drilled hole 22, as shown more specifically in FIG. 13.

FIG. 12A illustrates staking means 44 in the retracted position, in which position the staking means 44 is retained as the supply wheel 28 is being indexed.

Figure 12B:
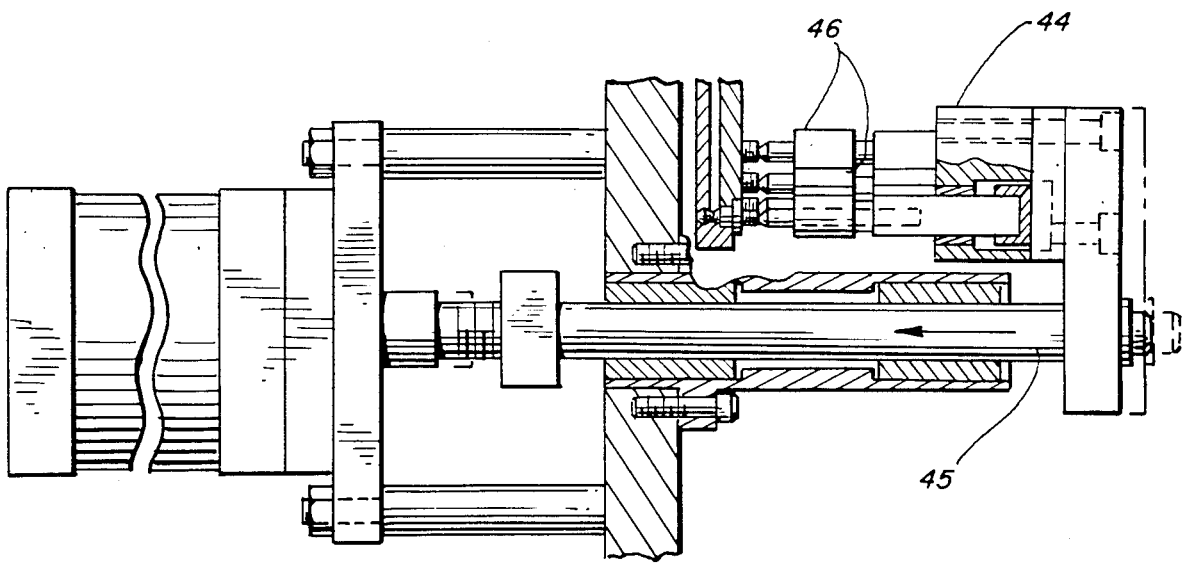

FIGS. 12B and 13 illustrate the staking means 44 in the staking position wherein edge 24 is being staked It is to be understood that the drilling and staking operations have been disclosed only as examples of possible successive working operations which can be utilized in accordance with the present invention and should in no way be considered to limit the scope of the present invention.

I claim:

1. An apparatus for simultaneously working a plurality of workpieces, comprising:
a support wheel defining a rotary axis and a periphery;
means for rotatably indexing said support wheel in preselected angular steps about said axis;
receiving means on said support wheel periphery for receiving one each said workpieces in similar orientation;
retaining means for fixedly retaining said workpieces in said receiving means;
first working means for simultaneously similarly first working a first worked portion of each of a preselected plurality of the workpieces retained in said receiving means, said plurality corresponding in number to one of said angular steps, to define a plurality of partially worked workpieces;
sensing means for simultaneously sensing the condition of the first worked portion of each of the worked workpieces and preventing further indexing of said support wheel in the event an undesirable condition of the first worked portion of any one of the workpieces is sensed;
second working means for further working the first worked portion of each of said workpieces subsequent to sensing of the condition thereof by said sensing means; and
means for delivering seriatim the further worked workpieces from said receiving means.

2. The working apparatus of claim 1 wherein said retaining means comprises clamp means selectively engageable with the workpieces for holding the workpieces against movement during working thereof by the working means.

3. The working apparatus of claim 1 wherein said retaining means comprises means extending circumjacent said wheel periphery for preventing displacement of the workpieces radially outwardly of said receiving means.

4. The working apparatus of claim 1 wherein said retaining means comprises means for retaining the workpieces in a preselected disposition parallel to said wheel axis for desired engagement thereof by the working means.

5. The working apparatus of claim 1 wherein said first working means comprises rotatable machining means.

6. The working apparatus of claim 1 wherein said second working means comprises staking means.

7. The working apparatus of claim 1 wherein said working means comprises forming means.

8. The working apparatus of claim 1 wherein said retaining means comprises resiliently biased means acting radially inwardly against the workpieces for resiliently urging the workpieces against the wheel periphery in said receiving means.

9. The working apparatus of claim 1 wherein said retaining means comprises a resiliently biased cord acting radially inwardly against the workpieces for resiliently urging the workpieces against the wheel periphery in said receiving means.

10. The working apparatus of claim 1 wherein said receiving means comprises radially outwardly opening notches on said support wheel periphery.

11. The working apparatus of claim 1 wherein said sensing means comprises means for simultaneously sensing the condition of less than all of the plurality of worked workpieces during each indexed step.

12. An apparatus for simultaneously working a plurality of workpieces comprising:
   a support wheel defining a rotary axis and a periphery;
   means for rotatably indexing said support wheel in preselected angular steps about said axis;
   receiving means on said support wheel periphery for receiving a preselected plurality of said workpieces at angular spaced positions;
   means for retaining said workpieces in said receiving means;
   first means for simultaneously similarly working a first worked portion of each of said plurality of retained workpieces in said receiving means;
   sensing means for simultaneously sensing a desired condition of each of the workpieces and preventing further indexing of said support wheel in the event such condition is not sensed in any one of the workpieces; and
   means for further simultaneously working the first worked portion of each of the workpieces subsequent to their being sensed by said sensing means.

13. The apparatus of claim 12 wherein said sensing means comprises means for transmitting a beam of light along a preselected path and means for blocking said path in the event said desired condition is not present in each of said plurality of workpieces 14. The apparatus of claim 12 wherein said working means comprises machining means.

15. The apparatus of claim 12 wherein said working means comprises means for providing a recess in each of said workpieces and said sensing means comprises means arranged to be projected into said recesses.

16. The apparatus of claim 12 wherein said working means comprises a plurality of drills and said retaining means comprises means for preventing rotation of the workpieces by said drills.

* * * * *